Aug. 17, 1926.
J. E. CROWELL
1,596,000
NUT
Filed Sept. 21, 1923
*Fig.1.*
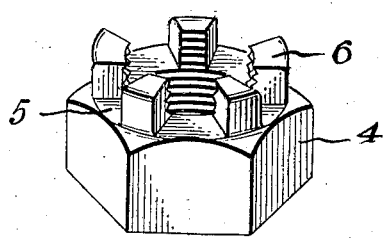
*Fig.2.*
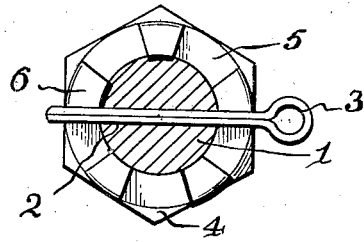
*Fig.3.*
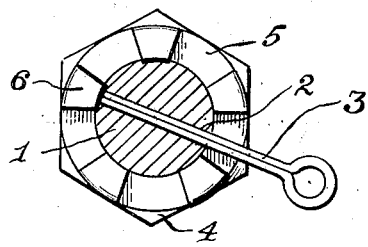
*Fig.4.*
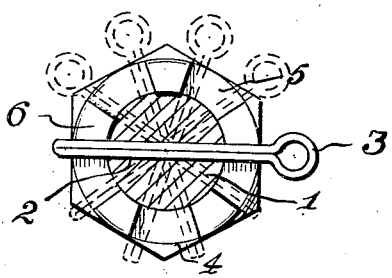
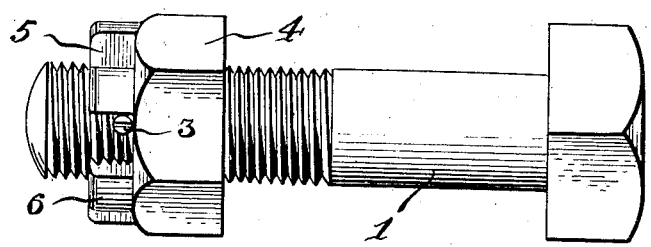
*Fig.5.*
John E. Crowell
Inventor
By C. E. Trainor
Attorney Patented Aug. 17, 1926.

1,596,000

UNITED STATES PATENT OFFICE.

JOHN E. CROWELL, OF MATTHEWS, NORTH CAROLINA.

NUT.

Application filed September 21, 1923. Serial No. 664,088.

This invention relates to an improvement in nuts, and with respect to its more specific features, to castellated nuts.

An object of the invention is to provide a nut having cross key receiving openings, arranged to permit registration with a bolt opening with a minimum amount of rotation, after the nut is tight.

Another object is to so construct the openings that the key may be inserted without exact alinement of nut and bolt opening.

Another object is to so arrange the openings that both ends of the bolt opening may not be simultaneously hidden.

Another object is to so arrange the openings that the bent end of the cross key may be sheared by reverse movement of the nut, when it is desired to remove the key, without affecting the head end.

Another object is to arrange the openings in such manner that the ends of the key may be sheared in succession by reverse movement of the nut.

Another object is to provide a nut of the castellated type wherein the locking lugs are odd in number.

Another object is to provide in nuts of the above mentioned type, lugs so arranged and spaced, that the spaces are opposite the lugs, and of a width to receive the end of a cross key when the other end is at either side of the opposite lug.

Another object is to so construct and space the lugs, that the side walls of each will be in the planes of the symmetrical side walls of the space at the opposite side of the nut.

Another object is to provide a nut of lighter weight, and with less material, for the same sizes, and without increase in the cost of manufacture.

With these and other objects in view, the invention consists in the construction and novel combination of parts fully described hereinafter, illustrated in the accompanying drawings, and pointed out in the claims hereto appended; it being understood that various changes in the form, proportion, size and minor details of construction, within the scope of the claims, may be resorted to without departing from the spirit of the invention.

In the drawings forming a part hereof:—

Figure 1 is a perspective view of the improved nut;

Figure 2 is a top plan view of the nut, with the bolt in section;

Figures 3 and 4 are similar views, showing the method of inserting the cross key; and

Figure 5 is a side elevation of the nut in place on a bolt.

In the usual construction of nut designed to be locked to a bolt by a cross key, the nut has openings or passages for receiving the key, which openings or passages extend diametrically of the nut, and are of such size that no relative movement of bolt and nut is permitted when a key is in the passage. When the nut has been tightened to the desired degree, it often happens that the ends of the bolt opening are hidden. To uncover them it is necessary to continue turning the nut, and the threads are often damaged before the passages are alined so that the key may be inserted.

In the present invention I so arrange the passages of the nut, that with a very slight additional turning movement from any position, they may be brought into alinement with the bolt opening. I attain this end by forming in the nut a number of radial openings so arranged as to form a plurality of substantially Y-shaped passages, each of which is adapted to receive a cross key, extending diametrically of nut and bolt, through either branch. The material of the nut between the branches provides a locking lug against which the key engages at either side.

In the embodiment shown in the drawings, the nut, which is of the castellated type and of hexagonal contour, is designed for use with a bolt 1, of any usual type, having a diametrical opening 2 in the threaded end, for receiving a cross key 3, here shown as a cotter pin. The upper face of the nut 4 has radial grooves, spaces or openings 5, forming between them locking lugs 6, and the grooves or spaces are so arranged that a plurality of substantially Y-shaped passages is formed transversely of the nut.

In the present instance, I provide for the Y-shape of the passages by making the lugs and spaces odd in number, here shown as five, but the number is immaterial provided that it is odd. With this arrangement, each opening or space between a pair of lugs is opposite a lug, and to provide for the passage of the key through either branch diametrically of the nut, the spaces are of greater width than the lugs. They are of a width at least equal to the aggregate width of a lug and twice the diameter of the key.

When the passages are so arranged, both ends of the bolt opening cannot be simultaneously hidden. This fact is clearly demonstrated in Figure 3, wherein a lug is shown covering one end of the opening 2, but the other end is uncovered, and the key may be inserted from that end until it strikes the lug. Now by turning the nut one twentieth of a complete rotation, the hidden end will be uncovered, and the inserting of the key may be completed. No nice attention to alining apertures is ever needed. One end of the bolt opening is always open, and the striking of the lug at the other end against the key tells the operator the first named end is open.

The lugs and spaces are of such size and so disposed, that when the key is in the position of Figure 3, it may be engaged with either wall of the lug at the opposite side of the nut. This provides for ten positions of insertion, spaced at intervals of thirty six degrees.

In addition to being opposite the lugs, the side walls of each space are in the planes of the symmetrical side walls of the opposite lug. That is, the said side walls are in the planes of the adjacent side walls of the two spaces at the sides of the opposite lug. This provides for a positive lock against movement of the nut in either direction, the key being engaged at its opposite ends by lugs on the same side of the key, as shown in Figure 4.

In the usual construction of nut, with six lugs and six spaces, six positions of insertion are provided. In the improved nut, with five lugs and five spaces, there are ten positions of insertion, an increase of forty per cent, and for the same sizes, the improved nut is materially lighter of weight, a feature of importance in many uses.

When for any reason it becomes necessary to remove the nut, it may be easily effected, and without the necessity to straighten the bent end of the cross key, merely by backing off the nut far enough to shear the said end. The remainder of the key may then be easily withdrawn. Should the key be rusted solidly in place, the nut may be turned still further to shear the head end, thus freeing the nut.

It will be evident from an inspection of Figure 4, that the lugs in the improved nut are arranged in pairs, the members at opposite sides of the nut, and on the same side of lines diametrical to the center of the nut. This arrangement provides a positive lock to prevent turning of the nut in either direction, while it does not interfere with adjustment of the nut before the key is engaged with both lugs.

No departure from established methods of manufacture is necessary in the making of the improved nut, and the difference in appearance between it and the usual type is negligible. The cost should be less, because there is a saving of material in the wider spaces.

While the invention is shown in connection with a castellated nut, it will be understood that the principle of the invention is applicable to nuts of every character.

What I claim is:—

1. A nut having radial openings, the portions of the nut between the openings serving as abutments for engagement by a cross key, the opening so spaced that each is opposite an abutment, and of a size to aline the symmetrical walls of the abutments at opposite sides of the nut.

2. A castellated nut having cross key engaging lugs, the side walls thereof radial to the nut, said lugs arranged in pairs, the members of each pair on opposite sides of the nut, and on the same side of a line diametrical to the nut, and with the symmetrical walls thereof in alinement.

3. In combination a bolt having a diametrical passage for a cross key, a cross key in the passage, and a nut having radial openings, the portions of the nut between the openings serving as abutments for engagement by the ends of the cross key, the opening so spaced and of such width that any selected opening may be brought into alinement through the diametrical passage of the bolt with either of two openings at the other side of the nut.

In testimony whereof he has affixed his signature.

JOHN E. CROWELL,